United States Patent Office 3,697,351
Patented Oct. 10, 1972

3,697,351
METHOD OF BONDING HOLLOW FIBERS TO PLASTIC RESIN SUPPORTS BY RADIATION GRAFTING
David E. Harmer, Midland, Mich., John R. Jarema, Indianapolis, Ind., and Douglas E. Leng, Midland, Mich., assignors to The Dow Chemical Company, Midland, Mich.
No Drawing. Filed Mar. 19, 1968, Ser. No. 714,349
Int. Cl. B29c 19/02
U.S. Cl. 156—272                                   7 Claims

ABSTRACT OF THE DISCLOSURE

The bond between a plastic resin support or header and a hollow fiber embedded therein is improved by forming a graft polymer bond between the resin and the fiber. The graft polymer bond is formed by curing the resin with high energy radiation.

BACKGROUND OF THE INVENTION

This invention relates to an improved process to enhance the bonding between a resin and a hollow fiber embedded therein, wherein the cured resin provides a support or header for utilizing said hollow fibers in permeation devices. More particularly, this invention relates to thermosettable resins bonded by radiation grafting to the hollow fibers wherein the resin and hollow fiber are exposed to high energy radiation during the curing of the resin.

Permeable, hollow fiber separatory devices have been described in U.S. 3,342,729 to Strand; U.S. 3,228,876 and 3,228,877 to Mahon; U.S. 3,228,797 to Brown et al.; and U.S. 3,186,941 to Skiens. In general such devices utilize a plurality of fine, hollow, permeable fibers wherein portions of the fibers, usually terminal portions, are embedded in a plastic resin support or header. After curing the resin, a portion of the plastic header is cut, generally transverse to the longitudinal axis of the fiber therethrough, to expose a surface having fiber ends therein and said fiber ends having openings communicating with the interior of the fibers. Separatory devices are then constructed utilizing the hollow fibers as the separatory membrane with said devices having means to expose the interior of the fibers to one fluid and the exterior of the fibers to a second fluid without mixing of the two fluids.

Of great importance to the functional operation of such devices is the bond that is formed between the resin and the fiber and in particular the strength or ability of this bond to resist being broken due to swelling of the fiber. In operation the permeation unit may be subject to a wide variety of liquids many of which cause swelling of the fibers which in turn causes the fibers to break away from the resin support. A widely used resin or "potting" compound is a polyepoxide resin which generally provides a useful, adhesive bond between the resin and the fiber. However, this epoxide adhesive bond is not always strong enough to resist some of the temperature, pressure and/or solvent conditions of use. Consequently considerable research time has been spent towards finding new materials and processes which would improve the fiber resin bond and extend the operating life of the separatory devices.

SUMMARY OF THE INVENTION

The present invention provides an improved process for bonding a resin support or header to a hollow fiber embedded therein. The process comprises exposing the resin and the hollow fiber to high energy radiation to cure the resin whereby radiation grafting chemically unites the hollow fiber to the resin. By chemically uniting the polymer chains of the potting resin with those comprising the outside layers of the fiber walls severe swelling stresses can be endured. The invention contemplates using unsaturated thermosettable resins and hollow fibers prepared from a variety of polymeric materials.

DETAILED DESCRIPTION

Thermosettable resins useful in this invention can be readily prepared or are commercially available. A wide variety of such resins include the well-known unsaturated polyester resins, as well as newer resins such as vinyl ester resin and the like. The particular choice of resin will depend on the cured properties desired and mixtures of thermosettable resins can be advantageously used to design for particular properties not available with any one class of resin. The polyester or vinyl ester resins generally are admixed with a polymerizable monomer which offers an additional route to modify the properties of the cured resin.

Unsaturated polyesters represent one class of thermosettable resins suitable for use with this invention. Such resins are well known and are produced, generally, by reaction of a polyhydric alcohol with a polycarboxylic acid or its anhydride. When an unsaturated anhydride such as maleic anhyride is used an unsaturated polyester is produced which contains polymerizable double bonds. Curing by copolymerization of a reactive monomer such as styrene with the unsaturated polyester results in a three dimensional rigid network. In addition to styrene, a variety of ethylenically unsaturated monomers such as methyl methacrylate, vinyl toluene, $\alpha$-methyl styrene, divinyl benzene, the halogenated styrenes, diallyl phthalate, triallyl cyanurate or mixtures of the above may be used. Additional monomers are also listed on p. 30, Table II–1.7 in "Handbook of Reinforced Plastic," 1964, S. S. Oleesky and G. Mohr, Reinhold Publishing Corp., New York. The particular choice of monomer and the specific composition of the unsaturated polyester are dependent on the properties ultimately desired in the cured article and are known or readily determined by those skilled in the art. Additionally valuable information useful in selecting the resin and monomer can also be found on pp. 13–55 in the above reference.

Suitable, also, are the newer vinyl ester resins. These resins are generally prepared by reaction of an unsaturated carboxylic acid with a polyepoxide resin. The reaction of the polyepoxide with the carboxylic acid produces a thermosettable resin having terminal unsaturated groups which are polymerizable with monomers such as styrene. Such resins are described in more detail in U.S. 3,367,992 by C. R. Bearden and in the application of D. H. Swisher and D. H. Garms, Ser. No. 597,233, filed on Nov. 28, 1966 and are incorporated into this application by reference. A wide variety of ethylenically unsaturated monomers, in addition to styrene, can be employed with the vinyl ester resins and are fully disclosed in the above applications.

Generally, suitable thermosettable resins for practice with this invention contains polymerizable unsaturation in the resin such as the unsaturated polyester and vinyl ester resins previously described. Suitable also are polyepoxide resins containing aromatic vinyl amines or vinyl phenols.

A variety of procedures have been used to prepare the hollow fiber devices in which the terminal portion of the fiber is generally embedded in a plastic resin support or header. The resin can be applied as the hollow fibers are wound around a core or mandrel into various geometric configurations to provide a resinous section in the finished winding. After curing the resin the section is then partially cut away to expose the fiber ends and fiber openings in the surface. Bundles of essentially parallel fibers are also utilized in which the ends of the fibers are potted in the resin of choice and cured. The use of such bundles is described in the Mahon patents previously recited, for example.

The improvement, which is the subject of this invention, relates to exposing the uncured, thermosettable resin and the portion of the hollow fibers desired to be embedded therein to high energy radiation to cure the resin. The radiation dosage level can vary from about 0.02 to about 100 megarads with a preferred range of 5 to about 40 megarads for degassed resin samples. A megarad is one million rads. A rad is the amount of ionizing high energy radiation which produces an absorption of 100 ergs of energy per gram of absorbing material. The unit is well known and widely used.

Obviously, the greatest economy and advantage may be achieved when minimum radiation dosages are involved. Excessive dosage levels should be avoided to avoid degradation of the hollow fibers and resins. Curing can take place at room temperature and may also be employed at elevated temperatures.

The high energy ionizing radiation of the type contemplated as being useful in the practice of the present invention is capable of penetrating 0.1 mm. of aluminum or similar density material. Thus, although ultraviolet light is stopped at the surface of such a barrier, beta and gamma rays are easily capable of penetrating said barrier and are conveniently available from radioactive sources such as various radioactive forms of elements including cobalt-60 and cesium-137, nuclear fission products and the like. It is beneficial to employ the high energy radiation in a field of from about 50,000 rads (50 kilorads) to about 100,000 rads (100 kilorads) per hour intensity. However, intensities down to about 1 to 10 kilorads per hour and up to about 500 kilorads per hour and higher may be advantageously employed. Sources of radiation also include electron beam generators, such as linear accelerators and resonant transformers, X-ray generators and the like.

Various materials can be used for making the permeable continuous hollow fibers suitable for the practice of this invention. Most of these are organic materials, for example polymeric materials such as the acetate, triacetate, propionate, nitrate, etc. esters of cellulose, including the mono-, di-, and tri-esters and mixtures of such esters; cellulose ethers, such as methyl, ethyl, hydroxy-alkyl, carboxy-alkyl, etc. including mixed cellulose ethers; regenerated cellulose; polyvinyl alcohols; polysaccharides; casein and its derivatives; etc. The aforementioned are hydrophilic in character and are more advantageous in separations involving aqueous systems.

However, for separation of organic components from fluid mixtures, various hydrophobic materials are particularly suitable, such as: polyolefins such as polyethylene, polypropylene, etc.; synthetic linear polyamides; polycarbonates; polyvinyl chloride and its copolymers; polyvinylidene chloride and its copolymers; acrylic ester polymers; organic silicone polymers; polyurethanes; polyvinyl formals and butyrals, and mixtures thereof; methacrylate polymers; styrene polymers; polyesters such as polyethylene terephthalate; and the like. Acrylonitrile polymers, and also certain cellulose derivatives, such as mixed ether-esters, can be modified to make them more hydrophilic or hydrophobic for whichever characteristics is desired in the practice of this invention.

Any of the foregoing materials, as well as other suitable permeable, hollow fiber forming materials can be utilized according to this invention. Also the hollow fiber membrane employed may be either inherently suitable or modified so as to make it suitable for ion exchange purposes, and in such case these hollow fibers can be used in the present cells for ion exchange purposes. Exemplary of such ionic exchange materials are those resinous materials containing such groups as carboxylic, sulfonic, phosphonic, amine, quaternary ammonium, mercaptan, enolate, and phenolic groups, such as sulfonated polyethylene, sulfonated polystyrene and the like.

Hollow fibers suitable for the practice of this invention can be made by techniques known in the art, as taught for example in British Pat. 514,638. In general, such fibers are spun by melt, dry or wet spinning techniques depending upon the particular fiber-forming materials being used. The spinnerette is selected according to the type of spinning procedure used and the particular dimensions desired in the hollow fiber. For the production of the hollow fiber, the spinnerette has a small annular opening in the orifice through which the spinning composition is extruded.

To illustrate this invention several hollow polyethylene fibers having an outside diameter of about 181 microns were cleaned with chloroform. One end of each of the cleaned fibers was placed into a bore in a ¼ inch x ¼ inch Swagelock polyethylene plug and temporarily held in place with a silicone sealant, DC–731. Into the cavity formed by the plug and the sealant was poured a potting resin comprising about 33% styrene and 67% of a commercially available polyester resin, Atlac 382. Atlac 382 is a bisphenol A fumarate resin prepared according to U.S. 2,634,251. The assembly was then transferred to a radiation chamber maintained at ambient temperature wherein the resin and the fiber were given an exposure dose of 25 megarads at a rate of 200 kilorads/hour.

Previously, attempts were made to secure polyethylene fibers into a peroxide catalyzed polyester formulation without much success since the polyethylene when swollen became detached from the resin.

However, a hollow fiber separatory device prepared with hollow polyethylene fibers, as above, was operated for over eight months in contact with a solvent such as cyclohexane without any detectable change in the liquid seal.

The above description is set forth for purposes of illustration and definition of the invention. Variations and modifications thereof will be obvious to those skilled in the art and can be made without departing from the scope of the invention.

What is claimed is:

1. In a process of preparing a thermoset tube sheet member wherein exterior surface portions of a plurality of hollow fibers extend through and are bonded to a resinous sheet member by applying to said exterior surface portions a thermosettable resin and curing said resin to form a thermoset resin tube sheet member, the improvement which comprises exposing the unsaturated thermosettable resin applied to the exterior surface portions of the fibers to high energy radiation ranging from about 0.02 to about 100 megarads to cure said resin.

2. The process of claim 1 wherein said resin is admixed with a monomer copolymerizable with said resin.

3. The process of claim 2 wherein said monomer is styrene.

4. The process of claim 1 wherein said resin is an unsaturated polyester.

5. The process of claim 1 wherein said resin is a vinyl ester resin.

6. The process of claim 1 wherein said fiber is a hollow polyethylene fiber.

7. The process of claim 1 wherein said radiation ranges from about 5 to about 40 megarads.

References Cited

UNITED STATES PATENTS

| | | | |
|---|---|---|---|
| 3,255,280 | 6/1966 | Burrowes | 156—296 X |
| 3,268,312 | 8/1966 | Grant | 156—296 X |
| 3,333,278 | 7/1967 | Hawkins et al. | 156—296 X |
| 3,303,085 | 2/1967 | Price et al. | 156—272 X |

CARL D. QUARFORTH, Primary Examiner

S. J. LECHERT, Jr., Assistant Examiner

U.S. Cl. X.R.

156—293, 303.1, 306